(12) United States Patent
Olson et al.

(10) Patent No.: US 8,978,288 B2
(45) Date of Patent: Mar. 17, 2015

(54) TIP-UP ICE FISHING APPARATUS

(71) Applicant: Jerry L. Olson, Lander, WY (US)

(72) Inventors: Jerry L. Olson, Lander, WY (US); Pat Thayer, Riverton, WY (US); Robert Wright, Riverton, WY (US); Donna Norton, Riverton, WY (US)

(73) Assignee: Jerry L. Olson, Lander, WY (US)

( * ) Notice: Subject to any disclaimer, the term of this patent is extended or adjusted under 35 U.S.C. 154(b) by 409 days.

(21) Appl. No.: 13/631,926

(22) Filed: Sep. 29, 2012

(65) Prior Publication Data

US 2014/0090287 A1 Apr. 3, 2014

(51) Int. Cl.
*A01K 97/12* (2006.01)

(52) U.S. Cl.
CPC ..................................... *A01K 97/12* (2013.01)
USPC ............................................................ 43/17

(58) Field of Classification Search
CPC ....... A01K 97/01; A01K 97/10; A01K 97/12; A01K 97/125
USPC ............................................................ 47/17
See application file for complete search history.

(56) References Cited

U.S. PATENT DOCUMENTS

| | | | |
|---|---|---|---|
| 3,190,026 A | 6/1965 | Roszak | |
| 3,352,048 A | 11/1967 | Fleming | |
| 3,359,673 A | 12/1967 | Roemer | |
| 3,739,514 A | 6/1973 | Odney | |
| 4,418,489 A * | 12/1983 | Mathauser | 43/17 |
| 4,520,586 A | 6/1985 | Moisan | |
| 4,651,460 A | 3/1987 | Sykes | |
| 4,727,673 A | 3/1988 | Dumar | |
| 4,996,788 A | 3/1991 | Wieting et al. | |
| 5,067,269 A | 11/1991 | Eppley et al. | |
| 5,097,618 A | 3/1992 | Stoffel | |
| 5,235,773 A * | 8/1993 | Rinehart | 43/17 |
| 5,274,944 A | 1/1994 | Laessig | |
| 5,297,357 A | 3/1994 | Bigelow et al. | |
| 5,438,789 A * | 8/1995 | Emory | 43/21.2 |
| 5,488,796 A | 2/1996 | Taylor et al. | |
| 5,564,213 A * | 10/1996 | Rinehart | 43/17 |
| 5,867,931 A | 2/1999 | Morris et al. | |
| 5,979,101 A | 11/1999 | Muenchow | |
| 6,408,561 B1 | 6/2002 | Winter | |
| 6,463,691 B1 | 10/2002 | Atkins | |
| 6,588,137 B1 * | 7/2003 | Rozkowski | 43/17 |
| 6,591,541 B1 * | 7/2003 | Cummings | 43/21.2 |
| 6,857,218 B1 * | 2/2005 | Grahl et al. | 43/17 |
| 6,898,892 B2 | 5/2005 | Senckowski | |
| 6,966,140 B1 | 11/2005 | Rozkowski | |
| 6,974,113 B1 * | 12/2005 | Clark et al. | 248/538 |

(Continued)

OTHER PUBLICATIONS

Frabill web pages (from www.frabill.com) showing product information.

*Primary Examiner* — Peter M Poon
*Assistant Examiner* — Danielle Clerkley
(74) *Attorney, Agent, or Firm* — Antoinette M. Tease

(57) ABSTRACT

A fish strike indicator and retrieval apparatus comprising an upper unit with a fishing reel holder, a battery holder, a line guide, a light flag, a printed circuit board enclosure, and a handle and a lower unit with a pair of slide rails and a detachable sliding mount that pivotally connects the upper unit to the lower unit. The invention incorporates a set of magnets and a Hall-effect sensor that activates and deactivates visual and audible alarm signals to signify a strike on the fishing line.

24 Claims, 13 Drawing Sheets

(56) References Cited

U.S. PATENT DOCUMENTS

| | | |
|---|---|---|
| 7,008,086 B1 | 3/2006 | Kell |
| 7,032,343 B1 | 4/2006 | Foss |
| 7,036,267 B2 | 5/2006 | Klein |
| 7,040,052 B1 | 5/2006 | Paulk |
| 7,207,133 B2 | 4/2007 | Schiemann et al. |
| 7,343,708 B2 | 3/2008 | Pieczynski |
| 7,395,628 B2 | 7/2008 | Rayfield |
| 2003/0089021 A1* | 5/2003 | Miller .............................. 43/21.2 |
| 2007/0169395 A1 | 7/2007 | Rayfield |
| 2007/0271835 A1* | 11/2007 | Wicinski ........................... 43/17 |
| 2010/0158605 A1* | 6/2010 | Gargaro et al. ................ 403/336 |

\* cited by examiner

TIP-UP ICE FISHING APPARATUS

BACKGROUND OF THE INVENTION

1. Field of the Invention

The present invention relates to the field of fishing equipment for ice fishing, and more particularly, to a device that provides mechanical and electronic alarms for signaling that a fish has taken a bait and additional means for retrieving the fish from the water.

2. Description of the Related Art

There are a number of mechanical and mechanical-electrical devices and means for providing visual and audible alerts to signal the fisherman when a fish bite is occurring that are the subject of issued patents or pending applications, and also multiple devices and means for retrieving fish through a hole in the ice, but none of these inventions includes the novel features of the present invention, most notably:

- a solid-state electronic switch unit that eliminates any moving electrical-contactor parts;
- a light signal having a color that may be changed by the user without changing any electrical components;
- a protective shield around the tip eyelet to prevent damage in the eyelet during transport;
- an easily adjustable mechanism for adjusting the alarm trigger sensitivity to compensate for different weights of baits and different sizes of reels;
- user-selectable visual and audible signal patterns to identity a particular unit or group of units;
- a base that forms a compact carrying case for the other components;
- a power-on glow light that indicates that the device is powered up and serves as a locator light in low-light conditions;
- a reel holder that is compatible with commercially available fishing reels to provide better fish retrieving control than provided by conventional tip-up reel spools;
- an integral hook keeper;
- a tackle box;
- a quick-detach (snap lock) mechanism that allows the upper unit to be easily removed from the lower unit, and a line removal slot to facilitate quick separation of the upper and lower units when retrieving a fish;
- an upper unit that provides the feel and function of a traditional fishing pole; and
- a battery pack that is mounted on the tipping arm and acts as a counterweight to improve the sensitivity and reliability of the alarm trigger.

U.S. Pat. No. 3,190,026 (Roszak, 1965) discloses a tip-up strike-indicator fishing apparatus that incorporates a visible flag and a battery-powered light signal that are activated when a fish strikes. The flag is gravity activated by means of a lever system, and the switch of the light circuit comprises conductive pieces of metal that come into contact when the flag is tripped.

U.S. Pat. No. 3,352,048 (Fleming, 1967) discloses an ice-fishing tip-up apparatus that comprises a submerged reel, a spring-activated flag, and a flashing strike-indicator light. In this invention, the light is powered continuously and appears to flash during a fish strike due to rotation of a translucent cover over the light that rotates as the fish pulls the line off the reel.

U.S. Pat. No. 3,359,673 (Roemer, 1967) discloses a strike-indicator apparatus that comprises a submerged reel and electrical signaling circuit that provides a light and a bell. The electrical circuit is controlled by a reed switch, wherein the reed switch is magnetically activated by a magnet that is attached to the reel, and wherein the magnet moves into proximity of the reed switch when the reel is rotated by a fish pull. The invention does not comprise a mechanical tip-up indicator.

U.S. Pat. No. 3,739,514 (Odney, 1973) describes a strike-indicator apparatus that provides an electrical light and/or buzzer indicator. The switch components of the electrical circuit are two electrical contacts, with one contact connected to a moveable arm. The two contacts come together when a fish pulls on the line, causing movement of the arm. In this invention, multiple fish-strike triggers may optionally be connected to a single light buzzer indicator box.

U.S. Pat. No. 4,520,586 (Moisan, 1985) discloses a strike indicator device that incorporates an electric light and an electrical contact for attachment of an optional external audible alarm device. The electrical circuit comprises a conductive metallic spring that is held in an open-circuit position by a trip device, wherein the trip device releases the metallic spring to a closed-circuit position when a fish pulls on a line that is connected to the trip device, thereby illuminating the electric light. The conductive metallic spring also serves as the tip-up pole for attaching a signal flag.

U.S. Pat. No. 4,651,460 (Sykes, 1987) discloses a mechanical (non-electric) fish-strike signaling device that comprises a spring-loaded tip-up flag that is released by a rotating cam that pushes the spring-loaded flag shaft off of a restraining ledge during a fish strike.

U.S. Pat. No. 4,727,673 (Dumar, 1988) discloses a strike-indicator light device that incorporates a removable light source (e.g., a modified flashlight), a spring-loaded tip-up flag, and a mechanical trip device. During a fish strike, the trip device releases the spring-loaded tip-up flag, and the movement of the tip-up flag pulls a release pin that is incorporated into the light circuit, thereby causing the light circuit to close.

U.S. Pat. No. 4,996,788 (Weiting, 1991) discloses a strike-indicator device that can be compactly stored. The device comprises a non-metallic platform, a spring-loaded tip-up flag, a rotating trip assembly attached to a submersed fishing line reel, and a remote signaling device. The pole is comprised of a metallic coil-spring base and a transparent hollow pole with an internal fluorescent light bulb. The color of the fluorescent bulb may be selected from one of the various available colors. The invention comprises a remote signaling feature comprised of a FM transmitter and matching remote FM receiver unit. When a fish pulls on the line, the reel rotates, causing the rotatable trip mechanism the release the spring-loaded flag. The metallic coil spring of the flag pole base contacts a second electric contact when the flag springs upward, thereby completing an electrical circuit which causes the fluorescent bulb to glow and the FM transmitter to transmit an alarm signal that is detected by the remote FM receiver, whereupon the receiver produces audible and/or visual signals.

U.S. Pat. No. 5,067,269 (Eppley et al., 1991) discloses an ice-fishing strike-indicator device that comprises a spring-loaded tip-up flag with an attached alarm light and a rotatable trip unit (trigger) connected to the line reel. When a fish pulls on the line, the trip arm rotates, thereby releasing the spring-loaded tip-up flag. The flag initially waves from side to side several times after springing upward, and then assumes a stationary upright position. A coil spring mounted around the base of the flag pole makes intermittent contact with an electrical plate as the pole waves from side to side, thereby intermittently closing an electrical circuit, which causes a light to flash on and off. When the flag pole becomes stationary, the coil spring makes constant contact with the metal plate, thereby causing the light to glow constantly as long as the flag is in the upright position.

U.S. Pat. No. 5,097,618 (Stoffel, 1992) discloses an electronic strike-indicator alert device that comprises a spring-loaded tip-up flag, a rotatable trip unit, and a radio transmitter that sends a signal to a receiver unit carried by the fisherman. When a fish pulls on the line reel, the rotatable trip releases the spring-loaded flag pole, which pops upward. The flag pole is attached to a magnet, and the magnet is coupled to a magnetic reed switch, so that when the pole springs up, the magnet is pulled away from the reed switch, and the reed switch closes, activating an electrical circuit, thereby turning on the radio transmitter, which sends a signal to the receiver.

U.S. Pat. No. 5,274,944 (Laessig, 1994) discloses an electrical strike-indicator apparatus that incorporates a tip-up flag in combination with an electrical alarm having an audible or visual indicator. In this apparatus, a flexible-shaft tip-up flag is bent downward and held against a rotatable line reel in the ready position. When the reel rotates as a result of a fish pulling on the line, a trip mechanism on the reel releases the flag shaft, which springs upward. The electrical circuit comprises two electrical contacts that are shaped so as to normally be in contact, and these contacts are held apart by the flag when the device is in the ready position. When a fish strikes and the flag springs upward, the flag, which serves as an insulator, is pulled from between the electrical contacts, causing the contacts to touch, thereby closing the electrical circuit and causing the alarm to be activated.

U.S. Pat. No. 6,463,691 (Atkins, 2002) discloses a tip-down strike indicator device that incorporates a magnetically activated proximity switch to close an electrical circuit, thereby triggering a light or buzzer when a fish strikes. The device also comprises a reel mounted on a rod in a laterally adjustable manner, so as to allow the sensitivity of the tipping action to be adjustable. A magnet is attached to the rod, so that when the rod tips downward as a result of a fish pulling on the line, the magnet comes into proximity of a commercial proximity switch, thereby closing the switch, which activates the electrical alarm circuit. In an alternate embodiment, the magnet and proximity switch are replaced with a tension-activated switch mounted on the spring arm, so that the switch is depressed by movement of the spring arm. The apparatus has retainer clips that may be used to hold rods for storage or transport.

U.S. Pat. No. 6,898,892 (Seckowki, 2005) discloses an electrical strike indicator apparatus that incorporates strobe light and buzzer alarms. The device comprises a rotatable arm that is connected to a fishing line. The device is triggered when a fish pulls on the line, causing the arm to rotate, and thereby bringing a metallic switch activator in close proximity to a proximity reed switch. The strobe light is mounted in a fixed position on the frame rather than on the rotating arm. The rotatable arm comprises twin yokes and a counterweight to reduce the force required to rotate the arm and trigger the alarm circuit. This device is configured so that the direction of line pull during a fish strike is upward.

U.S. Pat. No. 7,008,086 (Kell, 2006) discloses an electrical strike indicator device that comprises a spring-loaded tip-up flag, a rotatable trip unit, a flashing light alarm mounted on the upper end of the flag mast, and an optional FM transmitter alarm. The alarm circuit is triggered by a tilt-sensitive switch that is mounted on the flag mast, which is activated when the mast springs up to the vertical position as a result of a fish strike. The light source is mounted within a translucent housing.

U.S. Pat. No. 7,032,343 (Foss, 2006) discloses an electrical, portable fish-strike indicator apparatus that may be attached to conventional tip-up devices. The invention comprises visible and audible alarms that are enclosed within a colored, translucent housing. The invention is clamped to the flag mast of a conventional tip-up indicator so that the orientation of the invention changes as the flag mast pops up to the vertical position as a result of a fish strike. A mechanical pivot switch within the invention is in the open position when the flag mast is in the horizontal or ready position, and the pivot switch moves by gravity to the closed position when the mast pops up to the vertical position, thereby closing an electrical circuit that provides visible and audible alarms.

U.S. Pat. No. 7,036,267 (Klein, 2006) discloses an electrical tip-down strike-indicator device, having numerous alternate embodiments, that may be mounted on a receptacle such as a bucket or tackle box. The invention comprises an adjustable reel holder arm that may be locked at any desired angle, in order to optimize the position of the reel with respect to the ice hole when the invention is used with a particular receptacle. The invention comprises an electrical sensor of known construction that attached to the fishing line, so that a light and/or buzzer are activated when the line is moved as a result of a fish strike.

U.S. Pat. No. 7,207,133 (Schiemann, 2007) discloses an electrical tip-up strike-indicator apparatus that comprises a spring-loaded tip-up flag and a wireless transmitter for signaling a fish strike. The transmitter is triggered when the flag mast pops up to the vertical position following a fish strike, by means of the flag mast coming into contact with a push button located on the transmitter unit.

U.S. Pat. No. 7,343,708 (Piecznski, 2008) discloses an electrical strike-indicator apparatus that may be attached to a conventional tip-up indicator device. The invention comprises a flashing light with a user-selectable color that is mounted on the upper end of the tip-up flag mast. The color of the emitted light is changed by changing the colored LED light source with an LED of another color. The light is triggered by a tilt switch that utilizes either gravity or mechanically activated parts, and which is attached to the flag mast so that the switch closes when the mast pops up as a result of a fish strike. The housing of the electrical circuit is made from reflective material for improved visibility in poor light conditions.

U.S. Pat. No. 7,395,628 (Rayfield, 2008) discloses an electrical strike-indicator apparatus that provides visual and audible alarms. The invention provides for both tip-up and tip-down alarm actuators and incorporates a rod holder. The invention can be connected to multiple rods. The visible alarm consists of a light source within a clear portion of the plastic support housing, and the light may be programmed to either blink or remain on continuously. A transmitter may optionally be connected to the alarm circuit. Conventional tilt switches that are connected to the tip-up and tip-down units are used to trigger the alarms.

U.S. Patent Application No. 2007/0169395 (Rayfield, 2007) discloses an electrical lighting system that is attached to the mast of a tip-up strike-indicator device. The lighting system is comprises of a transparent housing with a lantern light inside the housing a multiple LED lights mounted on the outer surface of the housing.

U.S. Pat. No. 6,966,140 (Rozkowski, 2005) discloses an electronic fish-strike signaling apparatus that mounts on conventional fishing rods and can remain attached during casting the bait and playing a fish. The invention has an adjustably-sensitive trigger mechanism and an automatic reset. The electrical circuit comprises a magnetically-actuated proximity reed switch or, alternately, a conductive cantilevered leaf spring, to trigger the alarms and an optional integrated-circuit chip to control the timing of the alarms.

U.S. Pat. No. 7,040,052 (Paulk, 2006) discloses a fishing pole having an integral bite detector and a remote pager. The bite detector comprises a hinged line eyelet assembly on the rod tip, wherein the hinged eyelet incorporates an electrical switch, and the fishing line passes through the hinged eyelet. When a fish bite causes additional tension on the line, this tension causes the hinged eyelet to rotate downward, thereby closing an electrical circuit, which triggers an alarm light in the pole mast and a wireless transmitter in the rod handle.

U.S. Pat. No. 6,408,561 (Winter, 2002) discloses an electrical fish-bite alarm apparatus that may be used in conjunction with a conventional fishing pole or with an ice-fishing tip-up The alarm comprises a signal light and an audible speaker. When the invention is used as a fishing pole alarm, the trigger mechanism comprises two electrical contacts that are held apart by the fishing line, wherein the electrical contacts come into contact when the line is pulled away by tension from a fish bite. When the invention is used as a tip-up alarm, the trigger mechanism comprises an external tilt switch connected to the tip-up flag mast and an electrical connection cable from the tilt switch to the alarm unit. The tilt switch comprises a metal ball that rolls into contact with electrical contacts when the switch is raised to a vertical position as a result of a fish bite causing the flag mast to pop up.

U.S. Pat. No. 5,297,357 (Bigelow, 1994) discloses a mechanical (non-electrical) fish-catch signaling apparatus that incorporates visual and audible signals when a fish is pulling line off an integral line reel. When the reel rotates as a result of the fish pulling off line, mechanical components attached to the reel cause a flag to wave back and forth and a "clicker" device to emit clicking sounds.

BRIEF SUMMARY OF THE INVENTION

The present invention is a fish strike indicator and retrieval apparatus comprising: an upper unit comprising a fishing reel holder, battery holder, line guide, light flag, printed circuit board enclosure, and handle; and a lower unit comprising a pair of slide rails and a detachable sliding mount; wherein the detachable sliding mount pivotally connects the upper unit to the lower unit. In a preferred embodiment, the invention further comprises a line guard that is situated so as to prevent the line guide from being broken or damaged.

In a preferred embodiment, the lower unit further comprises four legs. Preferably, each leg comprises a bottom surface, and the bottom surface of each leg comprises a slip-resistant cleat. The lower unit preferably further comprises a tackle box.

In a preferred embodiment, the lower unit further comprises a line extraction slot. Preferably, the upper unit comprises pivot pins that fit into cradles located on the sliding mount. Each cradle on the sliding mount preferably comprises a snap-lock retaining tab that snaps over a pivot pin of the upper unit.

In a preferred embodiment, the printed circuit board enclosure comprises a power on/off switch, an alarm light on/off switch, and an audible signal on/off switch. Preferably, the invention further comprises a printed circuit board within the printed circuit board enclosure and a power-on indicator/locator light that is mounted on the printed circuit board.

In a preferred embodiment, the invention further comprises a printed circuit board within the printed circuit board enclosure and a Hall-effect sensor that is mounted on the printed circuit board. Preferably, the detachable sliding mount comprises a magnet holder containing one or more magnets that create a magnetic field with an effective range.

In a preferred embodiment, when the Hall-effect sensor is within the effective range of the magnetic field, an alarm circuit is deactivated. When the Hall-effect sensor is beyond the effective range of the magnetic field, an alarm circuit is activated. In yet another preferred embodiment, the invention is user-programmable to allow an alarm light, audible signal, both the alarm light and the audible signal, or neither the alarm light nor the audible signal, to function when the alarm circuit is activated.

In a preferred embodiment, the light flag is inserted into the printed circuit board enclosure. Preferably, the light flag is removable. The printed circuit board enclosure preferably comprises a hook keeper.

In a preferred embodiment, the detachable sliding mount has a right side and a left side and comprises at least one upper rail attachment tab that fits above a slide rail of the lower unit and at least one lower rail attachment tab that fits below a slide rail of the lower unit on the right side of the detachable sliding mount and at least one upper rail attachment tab that fits above a slide rail of the lower unit and at least one lower rail attachment tab that fits below a slide rail of the lower unit on the left side of the detachable sliding mount, thereby allowing the sliding mount to move laterally along a length of the slide rails without falling off.

In a preferred embodiment, the detachable sliding mount has a right side and a left side, the detachable sliding mount comprises an upper attachment tab on the right side of the detachable sliding mount and an upper attachment tab on the left side of the detachable sliding mount, each of the two slide rails comprises a plurality of equally spaced protrusions, and the protrusions are spaced apart from one another such that the upper attachment tabs fit between two adjacent protrusions.

In a preferred embodiment, a fishing reel is held by the fishing reel holder, the fishing reel holder comprises a shaft, and the position of the fishing reel is adjustable along the shaft of the fishing reel holder. In yet another preferred embodiment, the lower unit comprises a base with an underside, and the upper unit fits within the underside of the base. Preferably, the upper unit is prevented from moving laterally within the underside of the base of the lower unit by a plurality of stops. Preferably, the upper unit is presented from moving vertically within the underside of the base of the lower unit by a plurality of snap tabs. The underside of the base of the lower unit preferably comprises two second slide rails, and the detachable sliding mount comprises attachment tabs that fit onto the two second slide rails.

REFERENCE NUMBERS

Figure 1:
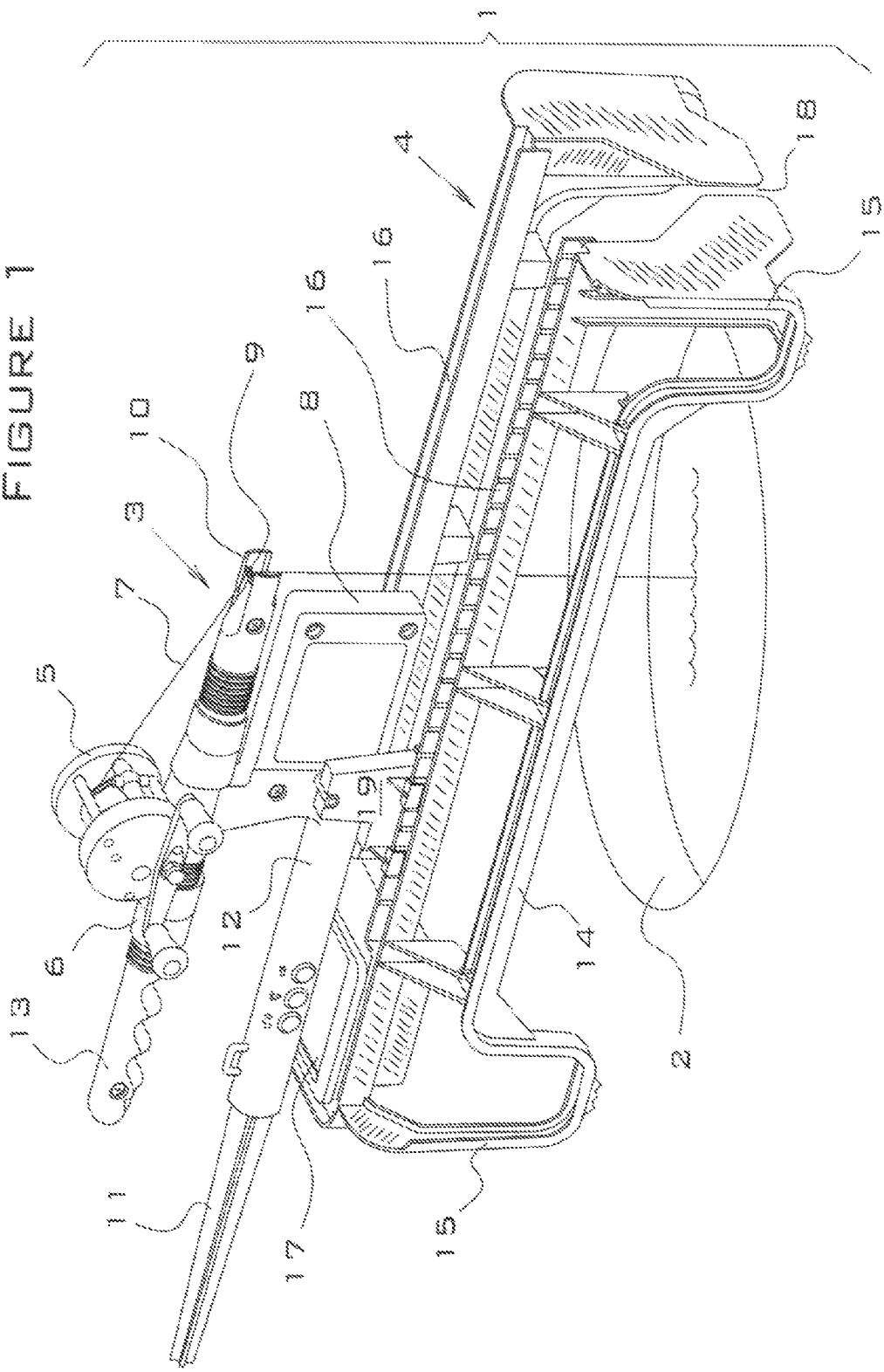
FIG. 1 is a perspective view of the present invention in the ready position, installed over a hole in the ice.

1 Fish strike indicator and retrieval apparatus
2 Hole in ice
3 Upper unit
4 Lower unit
5 Fishing reel
6 Reel holder
7 Fishing line
8 Battery holder
9 Line guide/eyelet
10 Eyelet guard
11 Light flag
12 Printed circuit board (PCB) enclosure
13 Handle
14 Base
15 Leg of base
16 First slide rails (on lower unit)
17 Tackle box
18 Line extraction slot
19 Sliding mount
20 Pivot pin
21 Cradle
22 On/off button for power
23 On/off button for light flag (visual signal)
24 On/off button for horn (audible signal)
25 Locator light
26 Hook keeper
27 Cleats
28 Snap-lock retaining tab
29 Upper rail attachment tab
30 Lower rail attachment tab
31 Magnet holder
32 Magnets
33 Protrusions on rail (adjustment stops)
34 Horn
35 Effective range of the magnetic field
36 Hall-effect sensor
37 Printed circuit board (PCB)
38 Mounting board
39 Alarm light LED
40 Metal-oxide semiconductor field-effect transistor (MOSFET)
41 Switch
42 Glow light LED, locator light LED
43 Capacitor
44 Schottky diode
45 Ground terminal
46 Positive terminal
47 Locking tab on light flag
48 O-ring
49 Storage stops
50 Storage snap tabs on bottom of base
51 Second slide rails (on lower unit)
52 Hanger loop

DETAILED DESCRIPTION OF INVENTION

The present invention is an ice fishing apparatus that provides multiple means for signaling a fish strike and a means for retrieving the fish. The signaling means include a brightly colored tip-up flag of user-selectable color that may optionally be configured to emit flashes of colored light when triggered by a fish strike, and an audible horn that may also be configured to optionally emit repetitive beeping sounds when the device is triggered. The pattern of light flashes and beeps may be set to one of nine available patterns (1 to 9 flashes and/or beeps, a pause, then repeated). The device comprises a lower unit and a rotatable (tip-up) upper reel assembly unit. Both units are composed primarily of polymer materials and are designed for injection-molded manufacture. The lower unit comprises a base, a tackle box, and a sliding mount that comprises a pair of pivot cradles and a magnet holder. The upper unit comprises a conventional fishing reel, a reel holder (that is somewhat similar in appearance to a short, conventional fishing rod), an electronic alarm circuit within a weather-resistant enclosure, a signal flag, a signal horn, a power indicator/locator light, a battery holder, and a pair of pivot arms.

In use, the lower unit is positioned over a fishing hole cut through an ice-covered lake with the hole approximately centered between the four legs of the base, and the upper unit is set horizontally upon the lower unit with the pivot arms of the upper unit resting within the pivot cradles of the lower unit. Fishing line is spooled off the reel, through an eyelet at the end of the reel holder, and downward through the hole in the ice into the water. The upper and lower units are manufactured so that the upper unit will pivot (i.e., tip up) as a result of a pull on the line caused by a fish biting bait attached to a hook on the end of the line. This pivoting movement causes the reel holder to move from a horizontal to a vertical position, with the front of the reel pointing downward when the reel unit is in the vertical position. The upper unit comprises a brightly colored and optionally luminescent "light flag" that is connected to a rear portion of the upper unit, so that when the front portion of the reel assembly pivots downward, the light flag pops into a vertical position, thereby providing a mechanical (non-electronic) signal to the fisherman that a fish is attached to the line.

The electronic alarm circuit (colored light and/or audible horn) is triggered by solid-state electronic circuitry that incorporates a Hall-effect proximity sensor and proximity magnets. The Hall-effect sensor is an integrated circuit chip mounted on a printed circuit board (PCB) within the upper unit, and the magnets are mounted on the lower unit. When the present invention is in the "ready" position (e.g., waiting for a fish strike), the magnetic field of the magnets is in close proximity to the Hall-effect sensor, causing the Hall-effect sensor to detect the magnetic field, and thereby causing the logic circuit connected to the Hall-effect sensor to place the alarm circuit in the deactivated or "off" state. Conversely, when the upper unit pivots vertically as a result of a fish pulling on the line, the Hall-effect sensor is pulled away from the magnets. When sufficient movement of the upper unit has occurred, the Hall-effect sensor can no longer detect the magnetic field produced by the magnets, and the logic circuit connected to the Hall-effect sensor causes the alarm circuit to switch to the activated or "on" state.

The triggering mechanism of the present invention is superior to the triggering mechanisms of the prior art, all of which comprise moving electrical contacts. Some of the prior art examples utilize simple spring-biased metal contactors that snap together when an insulating separator is removed as a result of a fish strike, and other examples of the prior art utilize magnetic reed switches to trigger the alarm circuit. Reed switches are manufactured components that contain miniature spring-biased electrical contacts. Moving metal contacts are prone to fatigue failure and are particularly vulnerable to failure under the low temperature conditions that are typically encountered during ice fishing. The present invention, by utilizing solid-state digital electronic components with no moving electrical parts in the trigger mechanism, eliminates the need for moving electrical contactor components, and thereby provides a substantial improvement in reliability and operational lifetime over the prior art.

The light flags of the present invention are manufactured from brightly colored translucent polymer such as polycarbonate. The light flags may be easily and quickly interchanged for light flags of another color. The light flags are preferably removably attached to the upper unit by means of a twist-and-lock feature that mates into the end of the PCB enclosure; alternately, the light flags may be threaded into the PCB enclosure. Different colored light flags on multiple units may be desirable when multiple fishermen are fishing together. For example, three fishermen could set their ice fishing rigs over multiple holes across a wide visible area, and the fishermen could sit together to socialize between fish strikes. In this case, one fisherman may use red light flags, another fisherman may use green light flags, and another fisherman may use blue light flags. During daytime fishing, there is no need for the LED alarm light to be on because the bright colors can be seen in the daytime conditions. Turning the LCD alarm light off during daytime conditions will conserve battery power. During low light conditions, the LED alarm light can be turned on, which will allow the light flag to be seen in the dark.

The light flags are illuminated by a flashing white LED light located on the PCB that is protected within a weather-resistant PCB enclosure located on the upper unit. Because the light flags are translucent and colored, light passes through the body of the light flags and is emitted as colored light. Examples of prior art that comprise different colored lights all require the user to change a colored light bulb, thereby exposing the electrical contacts of the circuit to the elements during the bulb change. The present invention uses the same white LED bulb in combination with interchangeable light flags. Because the present invention does not require exposing any electrical contacts during a change of light color, it provides a significant improvement in electrical reliability over the prior art.

The light and horn alarms of the present invention are programmable for different outputs by the user. Available visible alarm options include no emitted light, or one to nine light flashes followed by a pause, then repeated. Available audible alarm sound options include no sound, or one to nine beeps followed by a pause, then repeated. The number of flashes and beeps is programmed into the device by the user. This user-programmable feature may be desirable when multiple fishermen are fishing together. For example, three fishermen could set their ice fishing rigs over multiple holes, and the fisherman could gather inside a shelter between fish strikes. One fisherman may choose one beep, another fisherman may choose four beeps, and yet another fisherman may choose nine beeps to signal a strike on one of his tip-ups. There are no examples of user-programmable visual or audible alarms in the prior art, except for one invention (U.S. Pat. No. 7,395,628 to Rayfield) that provides for choice of either a flashing light or a non-flashing light.

The present invention is programmable by the user so that the indication of a fish strike can be audible, visual, both, or neither.

The present invention comprises three push-button switches that allow the device to be turned on and off, and are programmed in accordance with the preferences of the user. The switches are mounted on the PCB and are accessed by weatherproof rubber button covers located on the PCB enclosure. In the drawings, switch #1 (the left button) is labeled "1/0", switch #2 (the center button) is labeled with an icon of a light bulb, and switch #3 (the right button) is labeled with an icon of a horn. The switch labels are preferably molded into the PCB enclosure.

Switch #1 is the main power switch for the device. When this switch is pushed once, the alarm circuits are powered up, and a glow light within the translucent PCB enclosure will light to indicate that the unit is powered and to help locate the device in the dark. Pushing Switch #1 again and holding for 1.5 seconds will turn the power off. When the unit is powered up, the visual and audible alarms are automatically engaged.

Switch #2 controls the on/off power for the alarm light LED. If switch #2 is pushed once, the light flag will not emit flashes of light when the alarm circuit is activated. If switch #2 is pushed again, the light flag will emit flashes of light when the alarm circuit is activated.

Switch #3 controls the on/off power for the audible signal horn. If switch #3 is pushed once, the horn will not emit sounds when the alarm circuit is triggered. If switch #3 is pushed again, the horn will emit beeps when the alarm circuit is triggered.

The number of flashes and beeps is set by holding switch #2 and pushing switch #3 the number of times that is equal to the number of desired flashes and beeps (one to nine times). The programmed indicator signal controls both the flash and the beep intervals (i.e., five flashes, five beeps; four flashes, four beeps; etc.).

Electrical power is provided by three AA batteries (4.5 volts) that are contained within a weather-resistant battery holder that is integral to the upper unit.

The fishing reel is mounted on the reel holder by means of a first hood-and-nut combination that tightens over the rear foot of the reel base and a second hood-and-nut combination tightens over the front foot of the reel base. The two hood-and-nut combinations may be moved forward and rearward along the shaft of the reel holder by means of threads that are manufactured into the nuts and matching threads manufactured into the shaft of the reel holder. By this means, the reel may be positioned at any position along the threaded portion of the shaft of the reel holder. This forward-and-rearward adjustment capability is important for setting the balance of the rotating upper unit, so that the upper unit may be set to pivot to the vertical or "fish-on" position for any desired tension on the fishing line. For example, a heavy reel may need to be set near the center of gravity of the upper unit, while a lighter reel may need to be set in a more forward position along the shaft of the reel holder to provide for tipping of the upper unit to occur when a force of one ounce is applied to the line.

Alternately, for a given reel, the reel may be set near the center of gravity to provide for tipping of the upper unit when a force of one ounce is applied to the line, or the reel may be set in a more rearward position along the shaft, so that a force of at least three ounces is required to cause the upper unit to tip. This adjustment is useful, for example, to correctly set the correct light tipping force for fish that are known to apply light line pulls (for example, walleye and perch) and also to set the correct heavy tipping force for fish that are known to apply strong pulls to the line (for example, trout and bass). The reel adjustment feature is also useful for compensating for different weights of bait.

The upper unit of the present invention is preferably constructed from semi-transparent or translucent polymer, so that light from the "power-on" indicator light will be visible through the PCB enclosure of the upper unit.

The sliding mount that attaches to the upper unit is designed to be adjustable laterally along the length of the base of the lower unit by sliding it along the supporting dual slide rails. The sliding mount may be removed from the lower unit (for storage) by sliding it off the front end of the rails. This lateral movement capability is useful for adjusting the position of the fishing line within the hole. The sliding mount is held in the desired position along the length of the slide rails by protrusions molded into the rails that cause a friction fit between the rails and the corresponding attachment tabs of the sliding mount. This friction may be overcome with sufficient manually applied lateral force, which will allow the slide mount to move laterally forward or rearward along the rails.

The lower unit of the present invention also comprises a tackle box within the base frame. The tackle box has a hinged lid. The lower unit also comprises a molded-in loop that serves as a hook keeper to minimize tangling of the line and bait when the unit is being transported or stored.

For storage or transport of the present invention, the upper unit and sliding mount may be snapped into spaces within the underside of the lower unit, thereby protecting the upper unit from damage and proving a compact package. A molded-in hanger loop is provided on the lower unit so that the unit may be hung for storage or retail sales display.

An eyelet protector is molded into the tip of the reel holder in order to provide protection for the eyelet when the device is in use, and also when the unit is being transported. The eyelet protector is particularly useful for protecting the eyelet when several upper units are placed eyelet-down in a common container such as a bucket for transport.

When a fish strike is detected, the fisherman collects the fish by grasping the handle of the reef holder with the left hand, pulling the upper unit away from the lower unit by lifting it vertically off the sliding mount, and then moving the lower unit away from the hole with the right hand while allowing the fishing line to pass through the line slot provided in the front side of the lower unit. The fish may then be reeled in by cranking the reel with the right hand and vise versa if a left-handled reel is used.

The construction and operation of the present invention is described more fully in the following section in reference to the FIGS. 1 through 14.

Referring to FIG. 1, a fish strike indicator and retrieval apparatus 1 is shown positioned over a hole in the ice 2 in the ready, or fishing, position. The fish strike indicator apparatus 1 is comprised of two major units, an upper unit 3 and a lower unit 4. The upper unit 3 comprises a fishing reel 5, a reel holder 6, a fishing line 7 (shown extending through the hole in the ice 2 into the open water below), a battery holder 8, a line guide/eyelet 9, a line guide guard 10, a light flag 11, a PCB enclosure 12, and a handle 13. As shown in the figures, a portion of the handle 13 preferably comprises finger-molded grips for ease of use. The lower unit 4 comprises a base 14 having four legs 15 and a pair of first slide rails 16, a tackle box 17, a line extraction slot 18, and a detachable sliding mount 19. The sliding mount 19 serves to pivotably connect the upper unit 3 to the lower unit 4 and is described in detail in reference to FIGS. 3 and 4.

Figure 2:
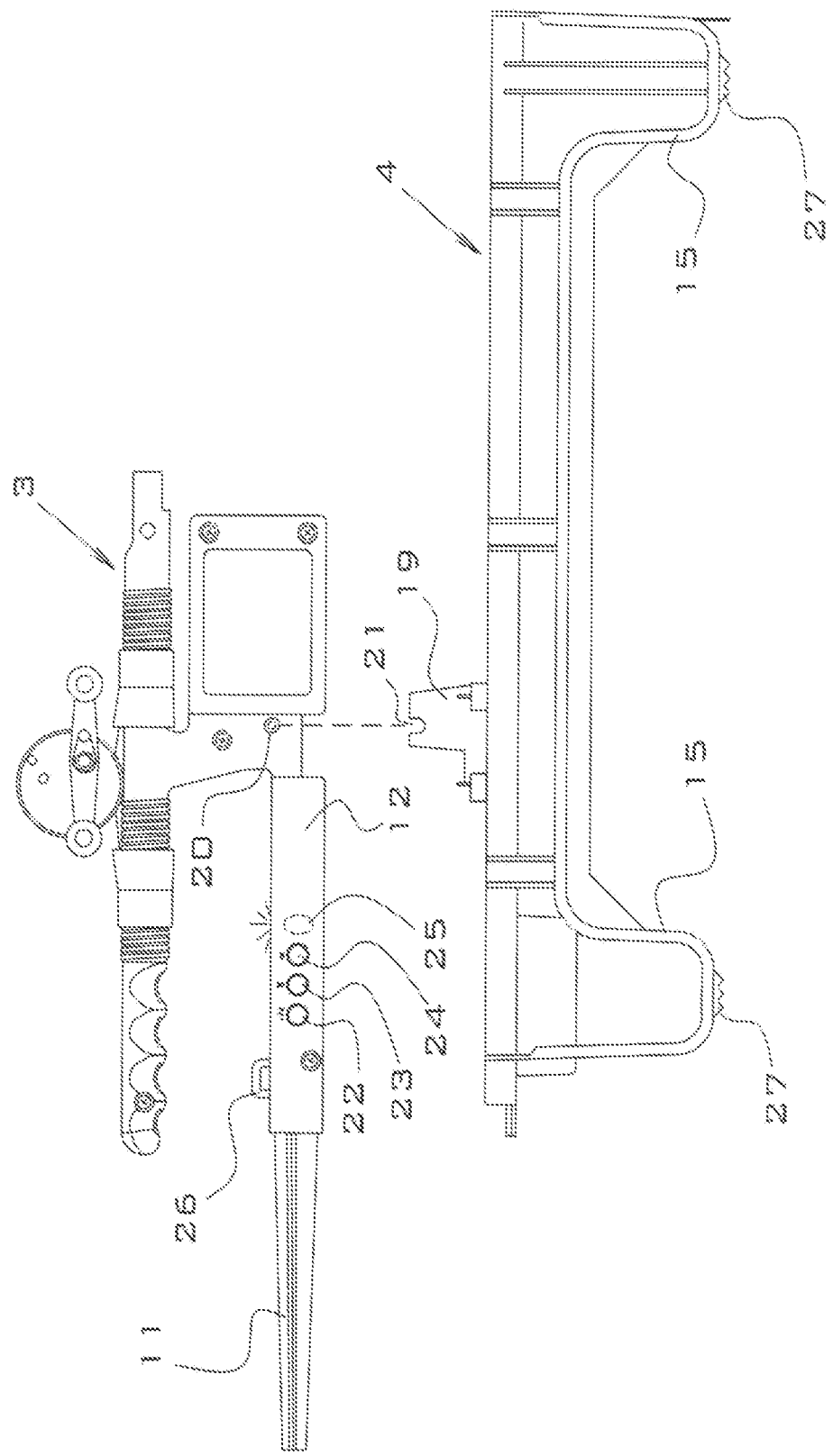
FIG. 2 is an exploded side view of the invention, with the upper and lower units separated.

FIG. 2 is an exploded side view of the present invention, showing the relationship of the upper unit 3, the lower unit 4, and the sliding mount 19 when the upper unit 3 has been removed from the lower unit 4. As shown, the pivot pins 20 of the upper unit 3 fit into matching cradles 21 located in the top of the sliding mount 19. Shown on the PCB enclosure 12 are three push button control switches, namely, a power on/off button 22, an alarm light LED on/off button 23, and an audible signal horn on/off button 24. Also indicated is the position of the power-on indicator/locator light 25, which is mounted on a PCB 37 within the translucent PCB enclosure 12. Also shown on the PCB enclosure 12 are a hook keeper loop 26 and a light flag 11. Shown on the lower unit 4 are slip-resistant cleats 27 that are molded into the bottom surfaces of legs 15.

Figure 3:
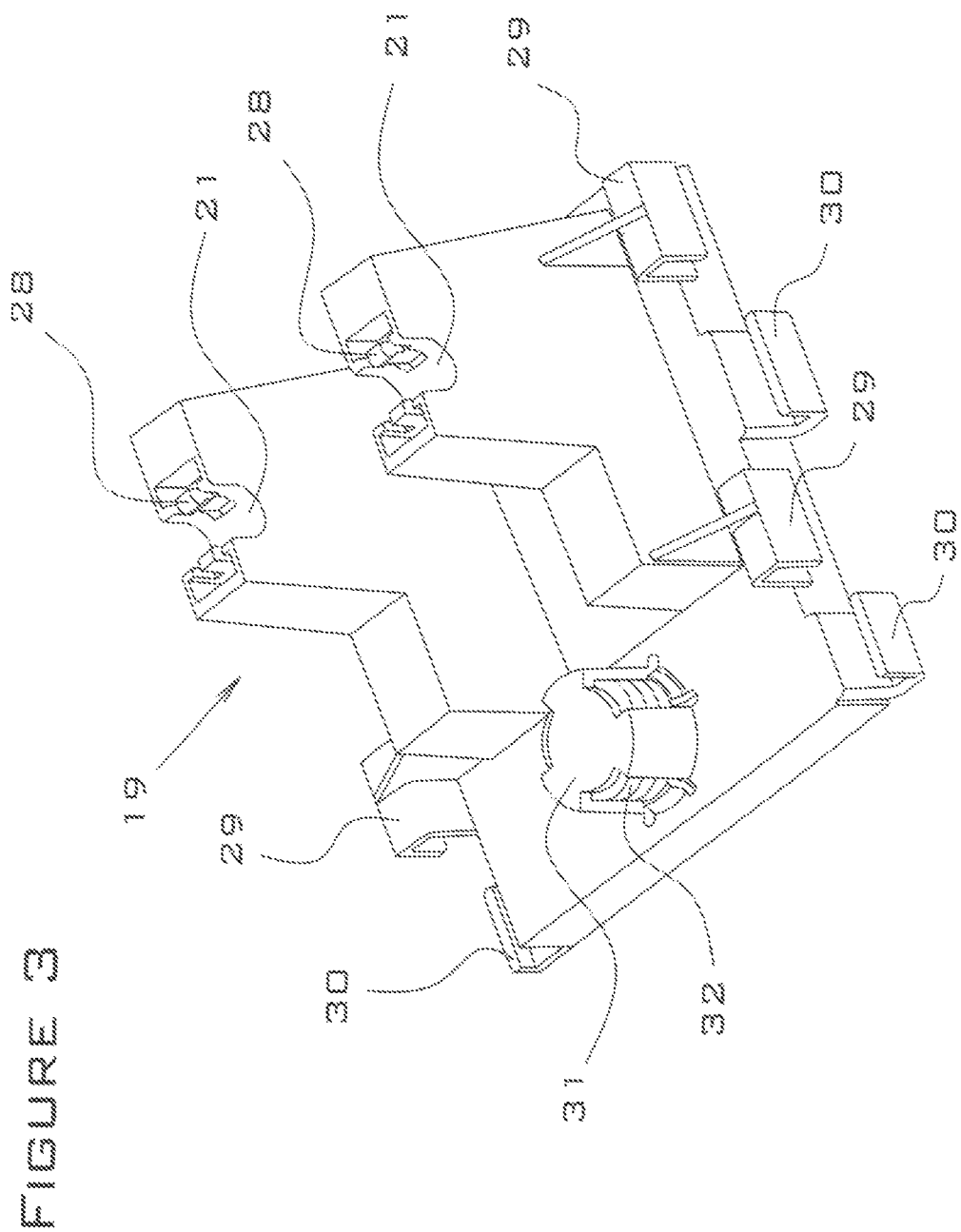
FIG. 3 is a perspective view of the sliding mount.

FIG. 3 is a magnified perspective view of the sliding mount 19. Referring to FIG. 3, the sliding mount 19 has two cradles 21 that support the pivot pins 20 of the upper unit 3 shown in FIG. 2. Each cradle 21 has a snap-lock retaining tab 28 that snaps over a pivot pin 20 of the upper unit 3, thereby providing a friction fit that retains the upper unit 3 in place on the lower unit 4 during a fish strike, but also allows the upper unit 3 to be quickly removed from the lower unit 4 by the fisherman to retrieve a fish, change baits, etc. Also shown in FIG. 3 are the upper rail attachment tabs 29 and the lower rail attachment tabs 30, which fit above and below the first slide rails 16 of the lower unit 4 (as shown in the following FIG. 4), thereby allowing the sliding mount 19 to move laterally along the length of the first slide rails 16, while being prevented from detaching from the lower unit 4 in the event of wind gusts, etc. The sliding mount 16 also comprises an integral magnet holder 31, which holds coin-shaped magnets 32. The magnets 32 are loaded into the magnet holder 31 from an opening (not shown) in the lower side of the magnet holder 31. The magnets 32 serve as a part of the proximity switch circuit, which is explained in detail in reference to FIGS. 8, 9 and 10.

Figure 4:
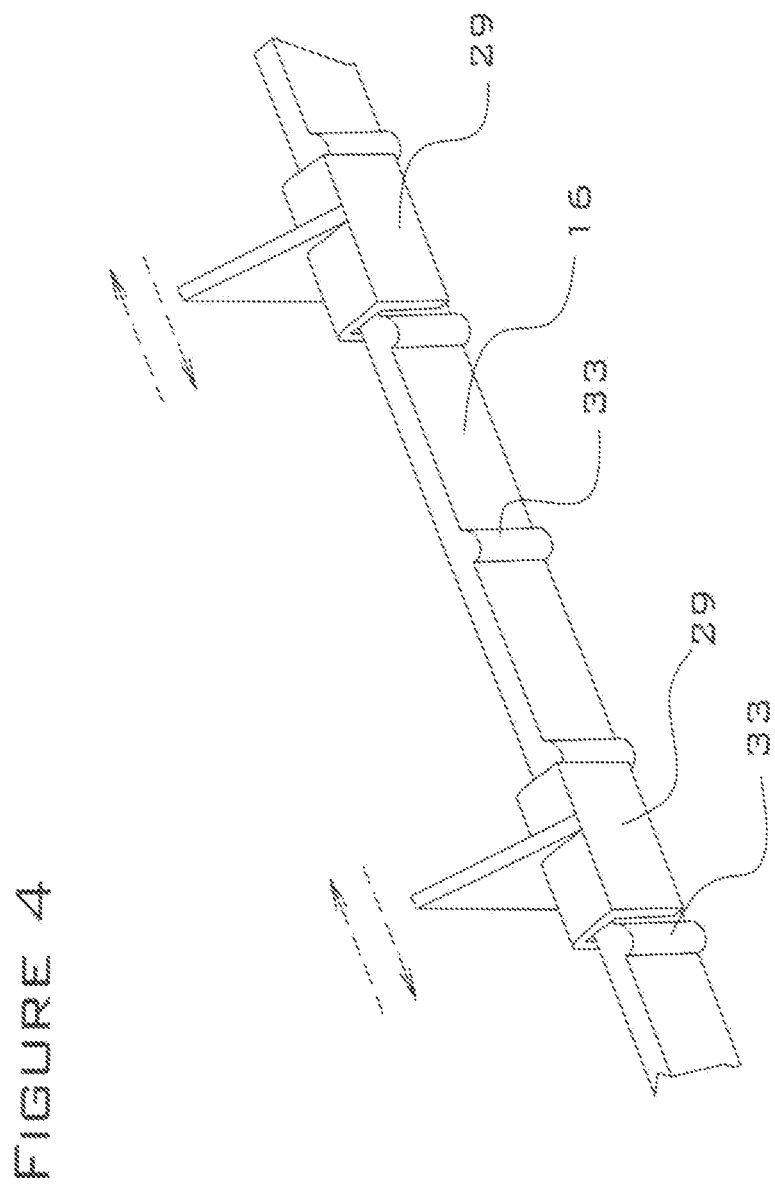
FIG. 4 is a detail perspective view of the upper attachment tabs of the sliding mount positioned on a first slide rail of the lower unit.

FIG. 4 is a magnified partial side view of the upper attachment tabs 29 in position on a first slide rail 16. The first slide rail 16 comprises equally spaced protrusions 33 with the spacing between adjacent protrusions 33 set so that each upper attachment tab 29 fits between two adjacent protrusions 33. The width of the protrusions 33 in relation to the mating width of the upper attachment tabs 29 is set so that the upper attachment tabs 29 are normally restrained from sliding along the first slide rail 16, unless manual lateral force is applied to the slide mount 19, thereby causing the upper attachment tubs 29 to slide over the protrusions 33, with the directions of allowable movement of the upper attachment tabs 29 illustrated by the pairs of dashed arrows.

Figure 5:
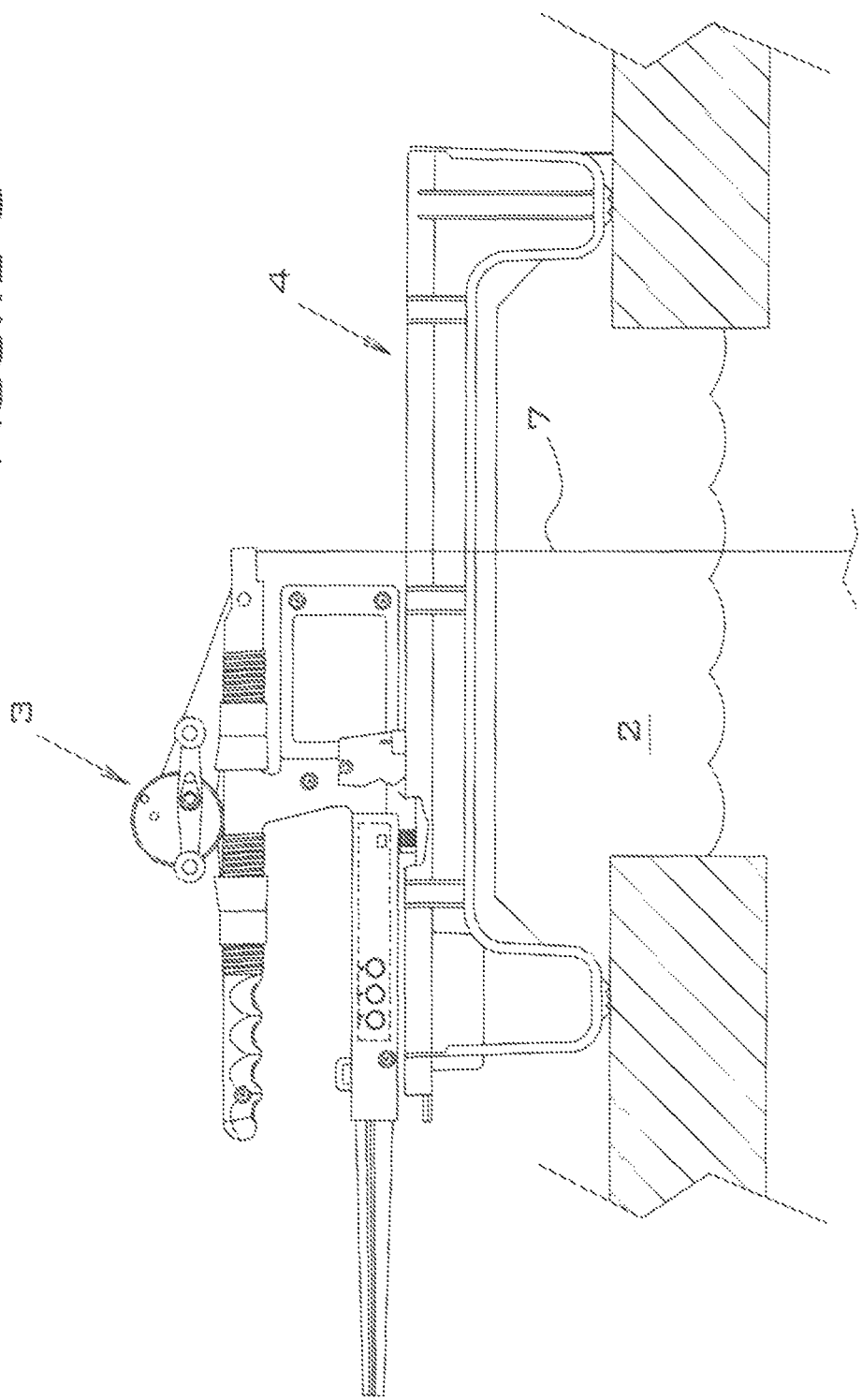
FIG. 5 is a side view of the invention in the ready position.
Figure 6:
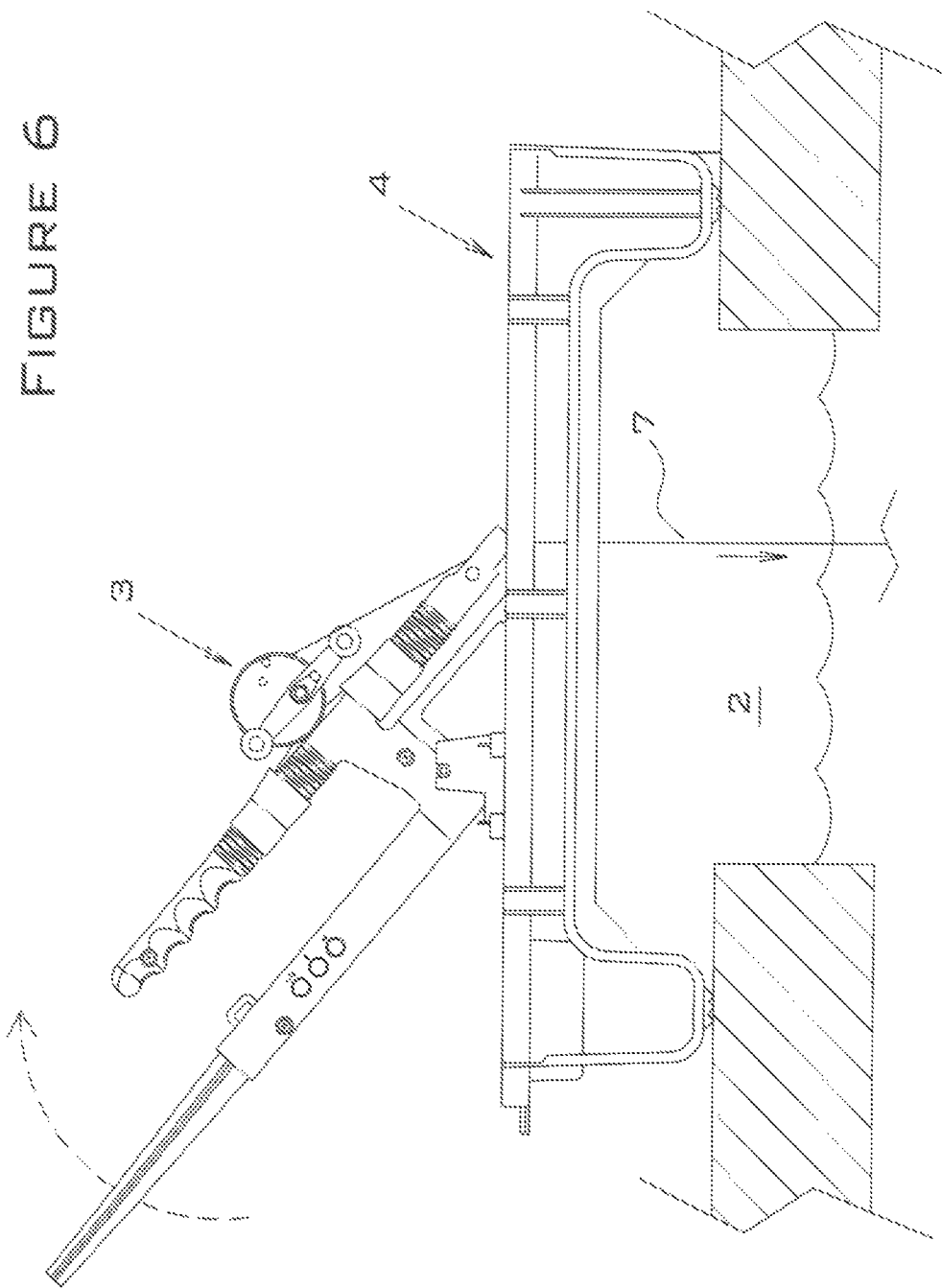
FIG. 6 is a side view of the invention shown with the upper unit at an intermediate, partially tipped position.
Figure 7:
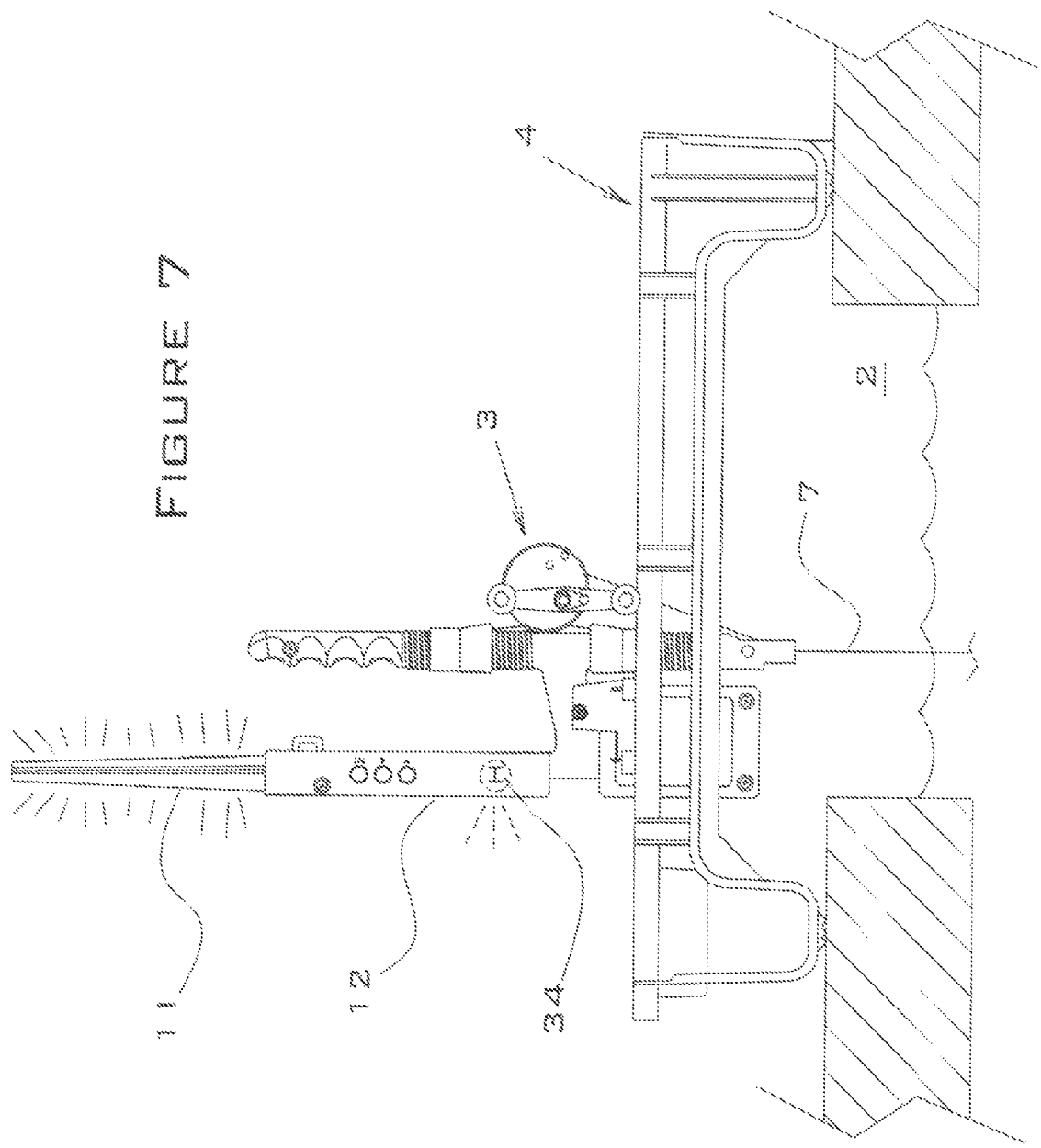
FIG. 7 is a side view of the invention shown with the upper unit in the fully raised or "tipped-up" position.

FIGS. 5, 6 and 7 are partial views of the present invention showing the relationship of the upper unit 3 and the lower unit 4 when the present invention is in three different rotational positions. FIG. 5 shows the present invention in a ready position, i.e., positioned with the upper unit 3 in a horizontal orientation and ready to catch a fish, with fishing line 7 extending through a hole in the ice but with no fish pulling on the line 7. FIG. 6 shows the upper unit 3 in a partially tipped position due to tension on the fishing line caused by a fish pulling on the line 7, with the direction of the rotational movement of the upper unit 3 illustrated by the dashed arrow and the downward movement of the fishing line 7 illustrated by the solid arrow. FIG. 7 shows the present invention with the upper unit 3 in a fully tipped position as would occur with a hooked fish on the line. In FIG. 7, the light flag 11 is shown emitting colored light, and the horn 34 is shown emitting sound. The horn 34 is mounted on the PCB 37 (not shown) within the PCB enclosure 12.

Figure 8:
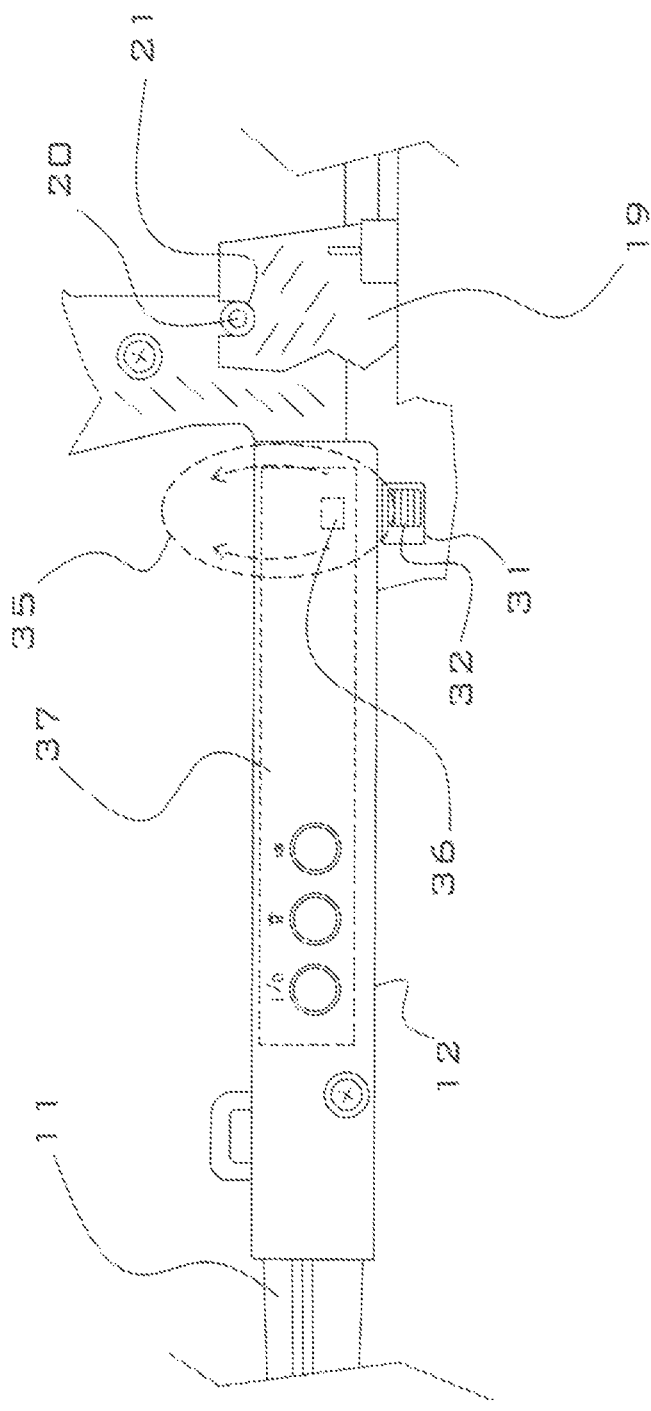
FIG. 8 is a partial side view of the invention illustrating the positional relationship of the magnetic field and the Hall-effect sensor when the invention is in the ready position.
Figure 9:
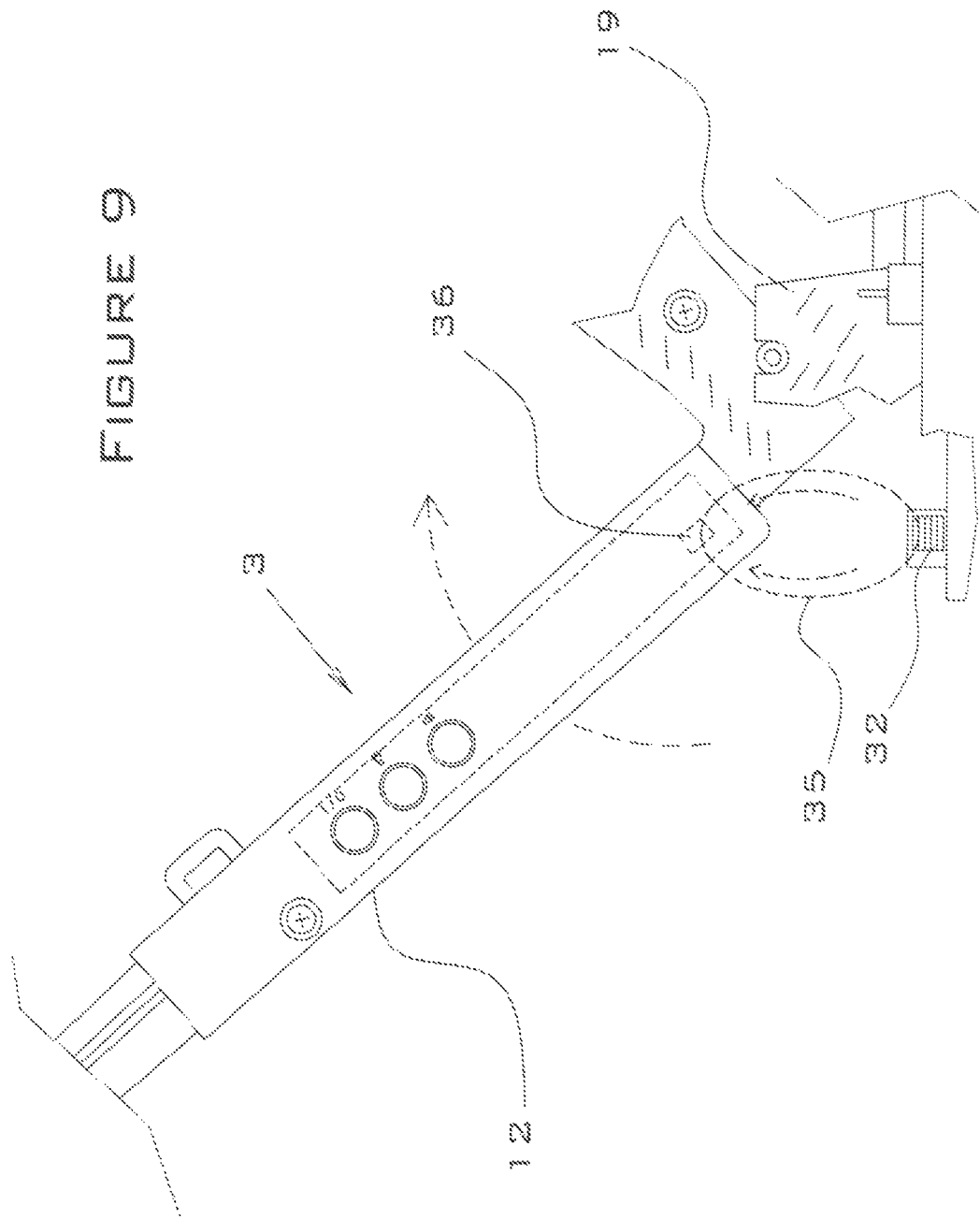
FIG. 9 is a partial side view of the invention illustrating the positional relationship of the magnetic field and the Hall-effect sensor when the invention is in a partially tipped position.
Figure 10:
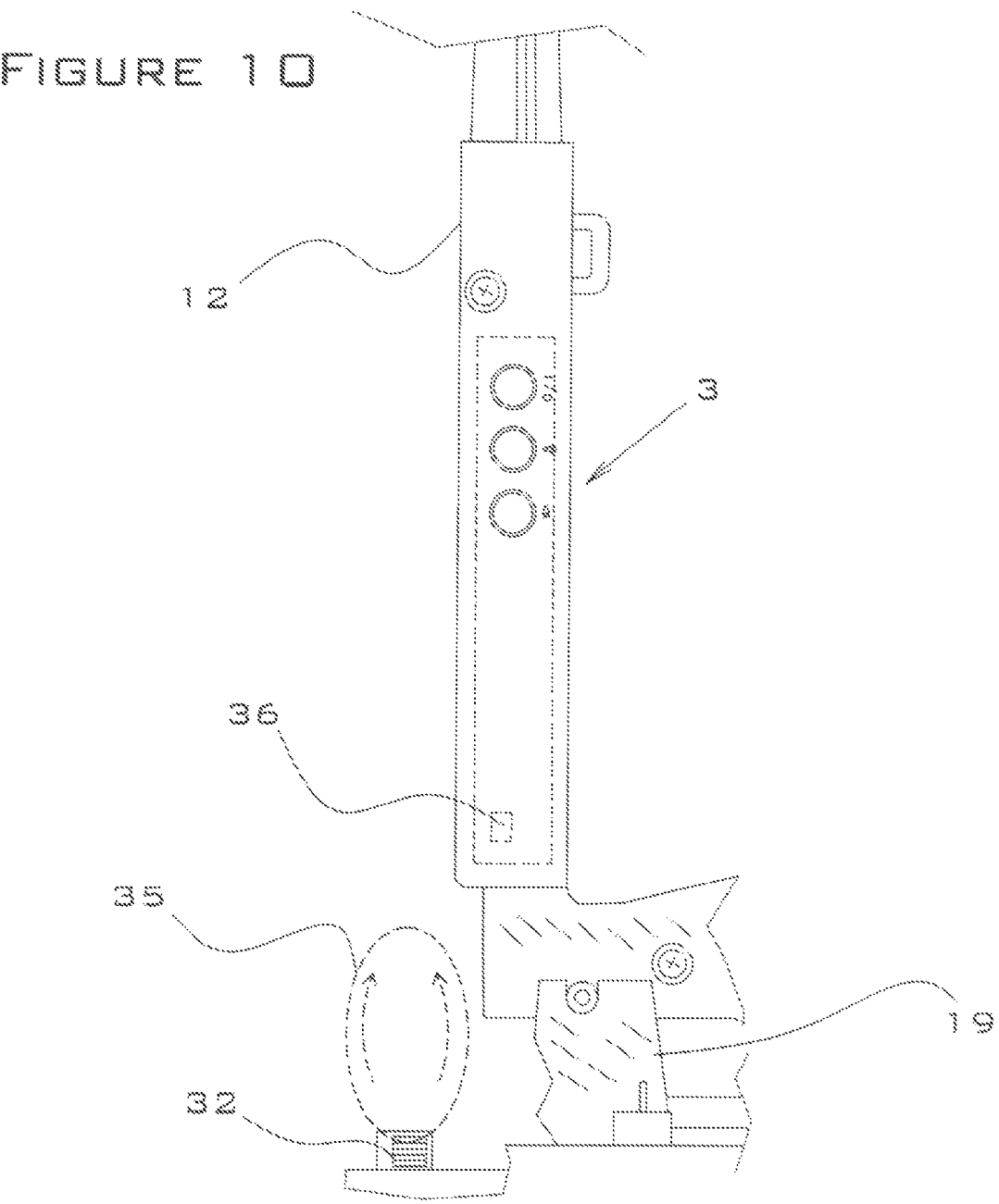
FIG. 10 is a partial side view of the invention illustrating the positional relationship of the magnetic field and the Hall-effect sensor when the invention is in the fully tipped position.

FIGS. 8, 9 and 10 are partial side views of the present invention with portions removed to show the relationship of the proximity switch parts with the present invention at the three positions previously shown in FIGS. 5, 6 and 7, respectively. FIG. 8 shows the present invention in a ready position. The effective range of the magnetic field 35 that is produced by the magnets 32 is represented by the dashed ellipse. The Hall-effect sensor 36 and logic circuit (which are both mounted on PCB 37) are configured so that when the Hall-effect sensor 36 is within the effective range of the magnetic field 35, the alarm circuit is deactivated; conversely, when the Hall-effect sensor 36 is beyond the effective range of the magnetic field 35, the alarm light LED 39 and horn 34 are activated. As shown in FIG. 8, in the ready position of the present invention, the PCB enclosure 12 rests directly on top of the magnet holder 31 so that the Hall-effect sensor 36 is within the effective range of the magnetic field 35 and, therefore, the alarms are deactivated. Numerous commercially available Hall-effect sensors are suitable for use in this application. One example of a suitable commercially available Hall-effect sensor 36 is a Model A3245 Hall-effect switch manufactured by Allegro Microsystems, of Worchester, Mass.

FIG. 9 illustrates the present invention with the upper unit 3 in the process of rotating to a "tipped-up" position as a result of a fish pull on the line. At this intermediate position, the Hall-effect sensor 36 is just within the effective range of the magnetic held 35, so that the alarms are still deactivated; however, any further movement will put the Hall-effect sensor 36 beyond the effective range of the magnetic field 35, thereby causing the alarms to activate.

The present invention is designed so that the battery weight will cause the upper unit 3 to tip to the full vertical position once a fish pull has raised the reel assembly to a desired degree of rotation, for example, about forty-five (45) degrees from horizontal. The proximity switch circuit is designed so that the alarms will not activate during minor fish nibbles, and will only activate when the upper unit 3 has rotated sufficiently for the battery weight to cause the reel assembly to proceed to full vertical rotation.

FIG. 10 illustrates the present invention with the upper unit 3 in the fully vertical or "fish-on" position. In this position, the Hall-effect sensor 36 is beyond the elective range of the magnetic field 35, and, therefore, the logic circuit has activated the alarms. As previously discussed, the present invention is user-programmable to allow the alarm light LED 39 or the horn 34, or both, or neither, to function when the alarm circuit is activated.

Figure 11:
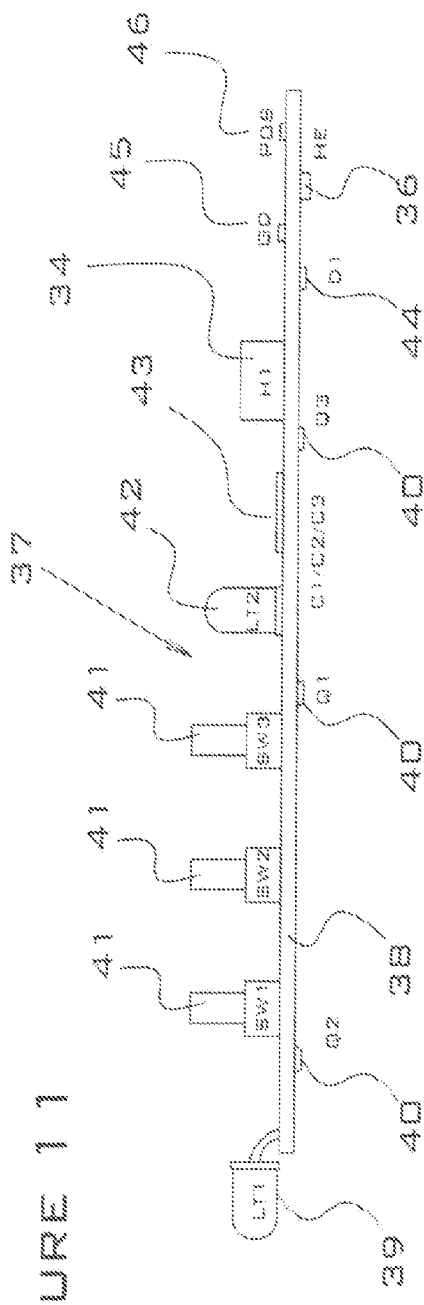
FIG. 11 is a side view of the printed circuit board showing the layout of the electronic components.
Figure 12:
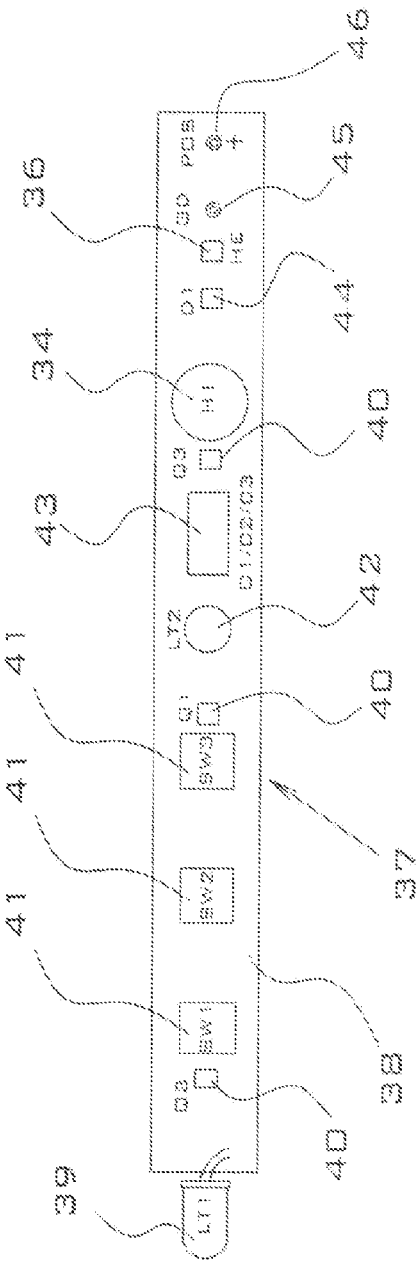
FIG. 12 is a top view of the printed circuit board showing the layout of the electronic components.

FIG. 11 is a side view of the PCB 37, and FIG. 12 is a top view of the PCB 37, showing the layout of the electronic components. Major components shown on FIGS. 11 and 12 include the mounting board 38, alarm light LED 39, MOS-FETS (Q1, Q2, and Q3) 40, switches (SW1, SW2, and SW3) 41, power-on indicator LED 42, capacitors (C1, C2, C3) 43, alarm horn 34, Schottky diode (D1) 44, Hall-effect sensor 36, ground terminal 45, and positive terminal 46.

Figure 13:
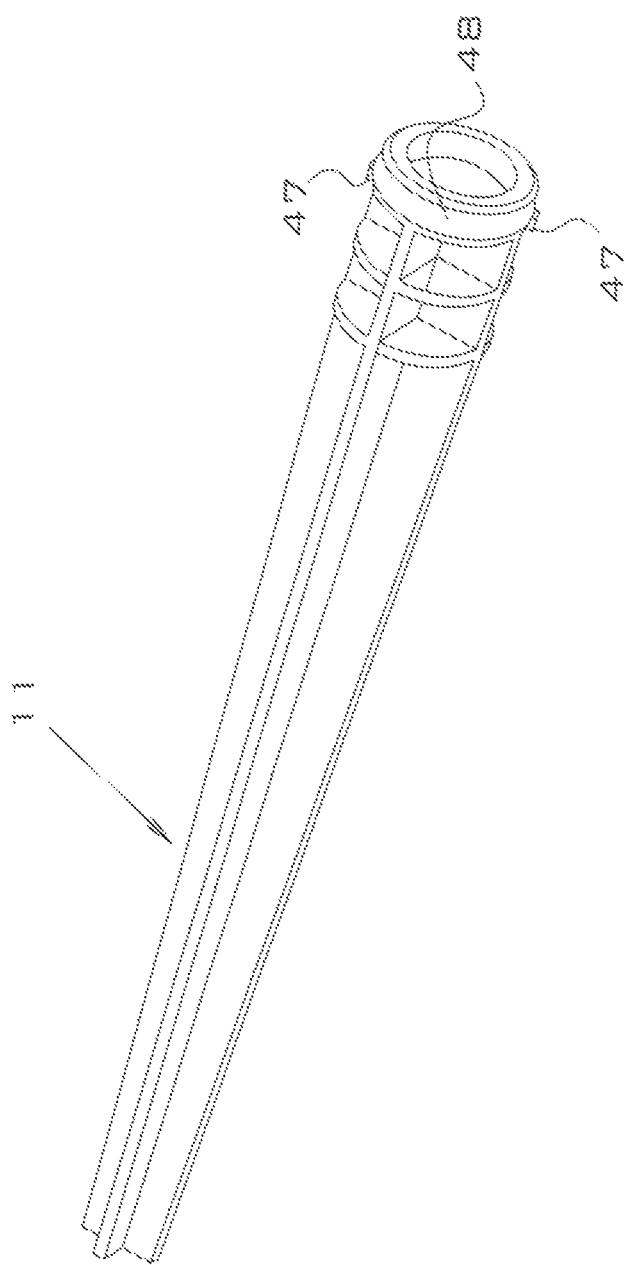
FIG. 13 is a perspective view of a light flag.

FIG. 13 is a perspective view of a light flag 11. This figure shows the opposing molded tabs 47 near the base of the light flag 11 that mate with matching slots on the inner wall of the PCB enclosure 12 (not shown). These tabs 47 and matching slots provide a twist-and-lock means for quickly attaching and removing a light bag 11 from the PCB enclosure 12. Also shown is an o-ring 48 that fits in a groove near the base of the light flag 11. The o-ring 48 provides a weatherproof seal between the light flag 11 and the PCB enclosure 12.

Figure 14:
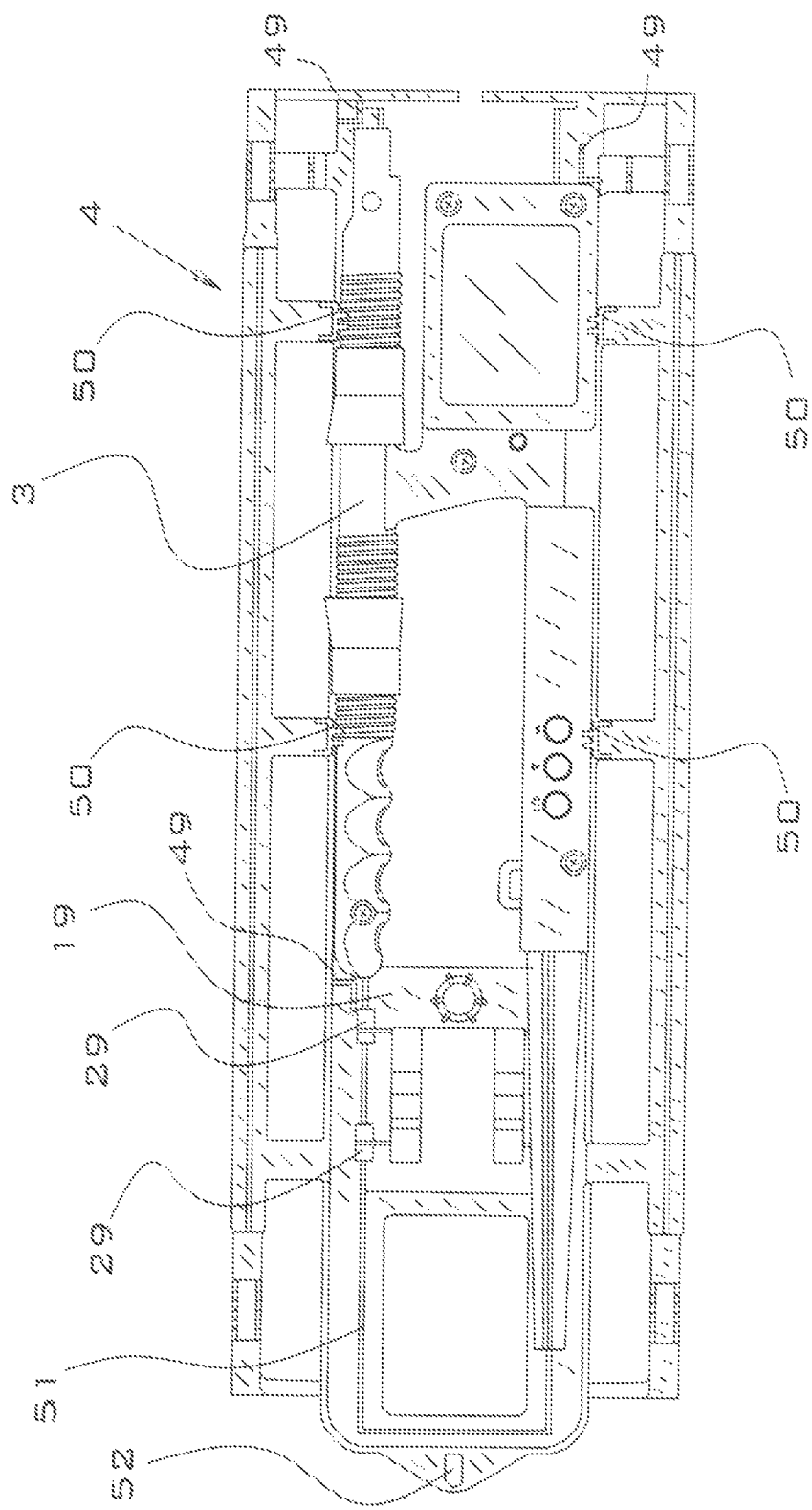
FIG. 14 is a bottom view of the invention shown with the upper unit and sliding mount stowed within the base of the lower unit.

FIG. 14 is a bottom view of the present invention with the upper unit 3 and the sliding mount 19 compactly stored within the underside of the base 14 of the lower unit 4. The fishing reel 5 (not shown) has been removed from the upper unit 3. This configuration is useful for stacking multiple units of the present invention in a compact space for store inventory, shipping, transport or storage. The upper unit 3 is held in position by three stops 40 and four snap tabs 50 that are integral parts of the base 14. The stops 49 prevent lateral motion of the upper unit 3 while the snap tabs 50 prevent vertical motion of the upper unit 3. The sliding mount 19 is held in position by upper rail attachment tabs 29 and lower rail attachment tabs 30 (not shown), which fit onto a pair of second slide rails 51 that are molded into the underside of the lower unit 4. A hanger loop 52 is shown, which provides a means for hanging the present invention vertically from a nail or screw in a wall to a hanger wire in a store shelf, when the components are nested in a stored position as shown in FIG. 14.

We claim:

1. A fish strike indicator and retrieval apparatus comprising: a) an upper unit comprising a fishing reel holder, battery holder, line guide, light flag, printed circuit board enclosure, and handle; and b) a lower unit comprising a pair of slide rails and a detachable sliding mount; wherein the detachable sliding mount pivotally connects the upper unit to the lower unit; wherein the lower unit further comprises a base with an underside, wherein the upper unit fits within the underside of the base for storage and transport.

2. The fish strike indicator and retrieval apparatus of claim 1, further comprising a line guard that is situated so as to prevent the line guide from being broken or damaged.

3. The fish strike indicator and retrieval apparatus of claim 1, wherein the lower unit further comprises four legs.

4. The fish strike indicator and retrieval apparatus of claim 3, wherein each leg comprises a bottom surface, and wherein the bottom surface of each leg comprises a slip-resistant cleat.

5. The fish strike indicator and retrieval apparatus of claim 1, wherein the lower unit further comprises a tackle box.

6. The fish strike indicator and retrieval apparatus of claim 1, wherein the lower unit further comprises a line extraction slot.

7. The fish strike indicator and retrieval apparatus of claim 1, wherein the upper unit comprises pivot pins that fit into cradles located on the sliding mount.

8. The fish strike indicator and retrieval apparatus of claim 7, wherein each cradle on the sliding meant comprises a snap-lock retaining tab that snaps over a pivot pin of the upper unit.

9. The fish strike indicator and retrieval apparatus of claim 1, wherein the printed circuit board enclosure comprises a power on/off switch, an alarm light on/off switch, and an audible signal on/off switch.

10. The fish strike indicator and retrieval apparatus of claim 1, further comprising a printed circuit board within the printed circuit board enclosure, and further comprising a power-on indicator/locator light that is mounted on the printed circuit board.

11. The fish strike indicator and retrieval apparatus of claim 1, further comprising a printed circuit board within the printed circuit board enclosure, and further comprising a Hall-effect sensor that is mounted on the printed circuit board.

12. The fish strike indicator and retrieval apparatus of claim 11, wherein the detachable sliding mount comprises a magnet holder containing one or more magnets that create a magnetic field with an effective range.

13. The fish strike indicator and retrieval apparatus of claim 12, wherein when the Hall-effect sensor is within the effective range of the magnetic field, an alarm circuit is deactivated.

14. The fish strike indicator and retrieval apparatus of claim 12, wherein when the Hall-effect sensor is beyond the effective range of the magnetic field, an alarm circuit is activated.

15. The fish strike indicator and retrieval apparatus of claim 14, wherein the apparatus is user-programmable to allow an alarm light, an audible signal, both the alarm light and the audible signal, or neither the alarm light nor the audible signal, to function when the alarm circuit is activated.

16. The fish strike indicator and retrieval apparatus of claim 1, wherein the light flag is inserted into the printed circuit board enclosure.

17. The fish strike indicator and retrieval apparatus of claim 16, wherein the light flag is removable.

18. The fish strike indicator and retrieval apparatus of claim 1, wherein the printed circuit board enclosure comprises a hook keeper.

19. The fish strike indicator and retrieval apparatus of claim 1, the detachable sliding mount having a right side and a left side, wherein the detachable sliding mount comprises at least one upper rail attachment tab that fits above a slide rail of the lower unit and at least one lower rail attachment tab that fits below a slide rail of the lower unit on the right side of the detachable sliding mount and at least one upper rail attachment tab that fits above a slide rail of the lower unit and at least one lower rail attachment tab that fits below a slide rail of the lower unit on the left side of the detachable sliding mount, thereby allowing the sliding mount to move laterally along a length of the slide rails without falling off.

20. The fish strike indicator and retrieval apparatus of claim 1, the detachable sliding mount having a right side and a left side, wherein the detachable sliding mount comprises an upper attachment tab on the right side of the detachable sliding mount and an upper attachment tab on the left side of the detachable sliding mount, wherein each of the two slide rails comprises a plurality of equally spaced protrusions, and wherein the protrusions are spaced apart from one another such that the upper attachment tabs fit between two adjacent protrusions.

21. The fish strike indicator and retrieval apparatus of claim 1, wherein a fishing reel is held by the fishing reel holder, wherein the fishing reel holder comprises a shaft, and wherein the position of the fishing reel is adjustable along the shaft of the fishing reel holder.

22. The fish strike indicator and retrieval apparatus of claim 1, wherein the upper unit is prevented from moving laterally within the underside of the base of the lower unit by a plurality of stops.

23. The fish strike indicator and retrieval apparatus of claim 1, wherein the upper unit is prevented from moving vertically within the underside of the base of the lower unit by a plurality of snap tabs.

24. The fish strike indicator and retrieval apparatus of claim 1, wherein the underside of the base of the lower unit comprises two second slide rails, and wherein the detachable sliding mount comprises attachment tabs that fit onto the two second slide rails.

* * * * *